(12) United States Patent
Shao et al.

(10) Patent No.: US 11,335,254 B2
(45) Date of Patent: May 17, 2022

(54) DISPLAY-DRIVING APPARATUS, METHOD, AND DISPLAY APPARATUS

(71) Applicants: BEIJING BOE OPTOELECTRONICS TECHNOLOGY CO., LTD., Beijing (CN); BOE Technology Group Co., Ltd., Beijing (CN)

(72) Inventors: Jiyang Shao, Beijing (CN); Yuxin Bi, Beijing (CN); Jian Sun, Beijing (CN); Hao Zhang, Beijing (CN); Feng Zi, Beijing (CN); Bingxin Liu, Beijing (CN); Yadong Ding, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 124 days.

(21) Appl. No.: 16/755,654

(22) PCT Filed: Oct. 22, 2019

(86) PCT No.: PCT/CN2019/112555
§ 371 (c)(1),
(2) Date: Apr. 13, 2020

(87) PCT Pub. No.: WO2020/199557
PCT Pub. Date: Oct. 8, 2020

(65) Prior Publication Data
US 2021/0256903 A1 Aug. 19, 2021

(30) Foreign Application Priority Data
Apr. 1, 2019 (CN) .......................... 201910257244.0

(51) Int. Cl.
*G09G 3/14* (2006.01)
*G09G 3/20* (2006.01)
*G09G 3/3225* (2016.01)

(52) U.S. Cl.
CPC ... *G09G 3/3225* (2013.01); *G09G 2310/0297* (2013.01); *G09G 2340/0457* (2013.01); *G09G 2360/02* (2013.01); *G09G 2380/00* (2013.01)

(58) Field of Classification Search
CPC .. G09G 5/00; G09G 5/10; G09G 5/14; G09G 5/36; G09G 3/00; G09G 3/14; G09G 3/20;
(Continued)

(56) References Cited

U.S. PATENT DOCUMENTS

2009/0237345 A1 9/2009 Kamada et al.
2010/0020243 A1* 1/2010 Kitano ................. H04N 21/426
348/691
(Continued)

FOREIGN PATENT DOCUMENTS

CN 1753489 A 3/2006
CN 101546542 A 9/2009
(Continued)

OTHER PUBLICATIONS

International Search Report & Written Opinion dated Feb. 1, 2020, regarding PCT/CN2019/112555.
(Continued)

*Primary Examiner* — Chanh D Nguyen
*Assistant Examiner* — Nguyen H Truong
(74) *Attorney, Agent, or Firm* — Intellectual Valley Law, P.C.

(57) ABSTRACT

A display-driving apparatus for driving a display panel having at least two display areas is provided. The apparatus includes a storage device configured to receive and store a
(Continued)

group of source data signals corresponding to a frame of image. The apparatus further includes a demultiplexer configured to split the group of source data signals into at least two sub-groups of data signals. Additionally, the apparatus includes a converter configured to convert a signal format of a respective one of the at least two sub-groups of data signals to a displayable format corresponding to the display panel. Furthermore, the apparatus includes a controller configured to transfer the at least two sub-groups of data signals in the displayable format to respective at least two display areas of the display panel to display a frame of image.

17 Claims, 9 Drawing Sheets

(58) Field of Classification Search
CPC .. G09G 3/32; G09G 3/34; G09G 3/36; G09G 3/3225; G09G 3/3266; G09G 3/3283; G09G 2310/0297; G09G 2340/0457; G09G 2360/02; G09G 2380/00; H04N 5/16; H04N 5/50; H04N 19/105; H04N 19/139; H04N 19/182; H04N 19/186; H04N 19/172; H04N 19/513; H04N 21/43; H04N 21/433; H04N 21/434; H04N 21/438; H04N 21/462; H04N 21/236; H04N 21/472; H04N 21/4385; H04N 21/4402; G06T 1/20; H04H 20/30; H04H 20/40; G11C 19/28; G02F 1/133; H01L 27/12; H01L 27/15; H01L 27/32; H01L 25/075; H01L 25/16; H01L 33/52; H01L 33/58; H01L 33/60; H01L 33/62; H01L 51/50; H01L 51/52; H01L 51/56; H04L 29/06; G06K 9/00; G06K 9/36; G06F 3/038
See application file for complete search history.

(56) References Cited

U.S. PATENT DOCUMENTS

| | | | |
|---|---|---|---|
| 2011/0169800 A1* | 7/2011 | Jun | G09G 3/3644 345/211 |
| 2012/0092388 A1 | 4/2012 | Kamon | |
| 2014/0184472 A1* | 7/2014 | Xia | G06F 3/1446 345/1.3 |
| 2015/0008396 A1* | 1/2015 | Naijo | H01L 51/0097 257/40 |
| 2016/0071463 A1* | 3/2016 | Takahashi | H01L 27/1225 345/76 |
| 2016/0078843 A1 | 3/2016 | Bai | |
| 2018/0288426 A1* | 10/2018 | Glen | H04N 19/174 |
| 2019/0035773 A1* | 1/2019 | Lo | H01L 33/52 |
| 2019/0073972 A1 | 3/2019 | Gao et al. | |
| 2019/0116321 A1* | 4/2019 | Grimm | H04N 21/41407 |
| 2019/0197943 A1* | 6/2019 | Mizunaga | G09G 3/2096 |

FOREIGN PATENT DOCUMENTS

| | | |
|---|---|---|
| CN | 201681587 U | 12/2010 |
| CN | 102460555 A | 5/2012 |
| CN | 103024313 A | 4/2013 |
| CN | 104240672 A | 12/2014 |
| CN | 106847228 A | 6/2017 |
| CN | 107610639 A | 1/2018 |
| CN | 107908309 A | 4/2018 |
| CN | 108877634 A | 11/2018 |
| JP | 2007166204 A | 6/2007 |

OTHER PUBLICATIONS

First Office Action in the Chinese Patent Application No. 201910257244.0, dated Apr. 14, 2021; English translation attached.

* cited by examiner

DISPLAY-DRIVING APPARATUS, METHOD, AND DISPLAY APPARATUS

CROSS-REFERENCE TO RELATED APPLICATION

This application is a national stage application under 35 U.S.C. § 371 of International Application No. PCT/CN2019/112555, filed Oct. 22, 2019, which claims priority to Chinese Patent Application No. 201910257244.0, filed Apr. 1, 2019. Each of the forgoing applications is herein incorporated by reference in its entirety for all purposes.

TECHNICAL FIELD

The present invention relates to display technology, more particularly, to a display-driving apparatus, a display-driving method, and a display apparatus.

BACKGROUND

Amount of image data signals that need to be processed for a display apparatus becomes larger and larger as the image quality is enhanced. For example, with improvement in raising image-resolution and refreshing-rate, even more source data need to be processed per unit operation time of the display apparatus. At the same time, for any display apparatus, especially in smaller form factor, such as portable Virtual-Reality (VR) or Augmented-Reality display apparatuses which has high demands in processing high-quality data signals for displaying super-high image-resolution pictures/videos, improvement in display hardware performance is highly desired.

SUMMARY

In an aspect, the present disclosure provides a display-driving apparatus for driving a display panel having at least two display areas. The display-driving apparatus includes a storage device configured to receive and store a group of source data signals corresponding to a frame of image. The display-driving apparatus further includes a demultiplexer configured to split the group of source data signals into at least two sub-groups of data signals. Additionally, the display-driving apparatus includes a converter configured to convert a signal format of a respective one of the at least two sub-groups of data signals to a displayable format corresponding to the display panel. Furthermore, the display-driving apparatus includes a controller configured to transfer the at least two sub-groups of data signals in the displayable format to respective at least two display areas of the display panel to display a frame of image.

Optionally, the demultiplexer includes a first-stage demultiplexer configured to selectively read at least two sub-groups of first-stage sub-group data signals out of the group of source data signals according to respective addresses stored in the storage device to at least two second-stage demultiplexers. Each of the at least two second-stage demultiplexers is configured to further split a respective one of the at least two sub-groups of first-stage sub-group data signals into at least two sub-groups of second-stages sub-group data signals.

Optionally, the display-driving apparatus further includes a signal processor configured to process a respective one of the at least two sub-groups of data signals to enhance image-resolution and/or refreshing-rate of the frame of image displayed on the display panel.

Optionally, the display-driving apparatus further includes an amplifier configured to strengthen the respective one of the at least two sub-groups of data signals if signal attenuation thereof is greater than a threshold.

Optionally, the demultiplexer includes a signal processor associated with each of the first-stage demultiplexer and the at least two second-stage demultiplexers and configured to process respective first-stage or second-stage sub-group data signals to enhance image-resolution and/or refreshing-rate of respective frame of sub-images to be displayed on the display panel.

Optionally, the display-driving apparatus further includes an amplifier configured to strengthen a respective one of first-stage sub-group data signals or a respective one of second-stage sub-group data signals to generate a respective one of strengthened sub-group data signals. The converter of the display-driving apparatus further includes a signal processor configured to process the strengthened sub-group data signals to generate enhanced sub-group data signals with enhanced image-resolution and/or refreshing-rate of a frame of sub-image to be displayed in the display panel.

Optionally, the demultiplexer is configured to split the group of source data signals into a first sub-group of odd-row data signals and a second sub-group of even-row data signals. The controller is configured to display a frame of sub-image at a first side of the display panel based on the first sub-group of odd-row data signals and to display a frame of sub-image at a second side of the display panel based on the second sub-group of even-row data signals.

Optionally, the display-driving apparatus further includes an interpolation processor configured to perform an interpolation to the first sub-group of odd-row data signals and/or the second sub-group of even-row data signals. The first sub-group of odd-row data signals and the second sub-group of even-row data signals are respectively converted to displayable format of the display panel. Image-resolution of a frame of image displayed at the first side based on the first sub-group of odd-row data signals plus a sub-group of even-row interpolated-data signals is made to be equal to image-resolution of a frame of image based on the group of source data signals; and/or image-resolution of a frame image displayed at the second side based on the second sub-group of even-row data signals plus a sub-group of odd-row interpolated-data signals is made to be equal to image-resolution of a frame of image based on the group of source data signals.

Optionally, the display panel includes multiple scan units and multiple drive units. Each of the at least two display areas is independently configured to display a frame of sub-image by a respective one of the multiple scan units and a respective one of the multiple drive units. Each of the at least two display areas is independently configured with multiple gate lines respectively connected to the respective one of the multiple scan units, and multiple data lines respectively connected to the respective one of the multiple drive units. The demultiplexer is configured to split the group of source data signals corresponding to a frame of image into at least two sub-groups of data signals respectively corresponding to a frame of sub-images to be displayed respectively in the at least two display areas.

Optionally, the controller is configured to control the respective one of the multiple scan units to sequentially turn on the multiple gate lines associated with a respective one of the at least two display areas corresponding to a respective one of the at least two sub-groups of data signals. The controller is also configured to control the respective one of the multiple drive units to transfer the respective one of the at least two sub-groups of data signals respectively to the multiple data lines. The controller is further configured to control the at least two display areas to display respective frames of sub-images simultaneously, thereby displaying the frame of image in the display panel.

In another aspect, the present disclosure provides a display apparatus including the display-driving apparatus described herein having a single display port for receiving a group of source data signals.

Optionally, the display apparatus includes a near-field display apparatus selected from a Virtual-Reality display apparatus and an Augmented-Reality display apparatus.

In yet another aspect, the present disclosure provides a method for driving a display panel. The method includes a step of receiving a group of source data signals corresponding to a frame of image. The method also includes a step of splitting the group of source data signals into at least two sub-groups of data signals. Additionally, the method includes a step of converting signal format of a respective one of the at least two sub-groups of data signals to a displayable format corresponding to the display panel. Furthermore, the method includes a step of transmitting the respective one of the at least two sub-groups of data signals in the displayable format to the display panel. Moreover, the method includes a step of controlling the display panel to display a frame of image based on the at least two sub-groups of data signals.

Optionally, the step of receiving the group of source data signals includes a sub-step of storing the group of source data signals into a storage device with respective addresses. The step of splitting the group of source data signals into at least two sub-groups of data signals includes a sub-step of selectively reading at least two sub-groups of first-stage sub-group data signals out of the group of source data signals according to the respective addresses stored in the storage device, and further includes a sub-step of splitting a respective one sub-group of the first-stage sub-group data signals into at least two sub-groups of second-stage sub-group data signals.

Optionally, the method further includes a step of enhancing image-resolution and/or refreshing-rate of a respective one of the at least two sub-groups of data signals. Furthermore, the method includes a step of strengthening the respective one of the at least two sub-groups of data signals if signal attenuation thereof is greater than a threshold before converting signal format of a respective one of the at least two sub-groups of data signals to a displayable format corresponding to the display panel.

Optionally, the method further includes a step of strengthening the respective one of first-stage sub-group data signals or a respective one of second-stage sub-group data signals to generate a respective one of strengthened sub-group data signals. The method further includes a step of processing the strengthened sub-group data signals to generate enhanced sub-group data signals with enhanced image-resolution and/or refreshing-rate of a frame of sub-image to be displayed in the display panel.

Optionally, the step of splitting the group of source data signals into at least two sub-groups of data signals includes a sub-step of splitting the group of source data signals into a first sub-group of odd-row data signals and a second sub-group of even-row data signals. The step of splitting the group of source data signals into at least two sub-groups of data signals also includes a sub-step of performing an interpolation process to first sub-group of odd-row data signals and/or the second sub-group of even-row data signals to generate a sub-group of even-row interpolated-data signals associated with the first sub-group of odd-row data signals and/or a sub-group of odd-row interpolated-data signals associated with the second sub-group of even-row data signals. Additionally, the step of splitting the group of source data signals into at least two sub-groups of data signals includes a sub-step of displaying a frame of image based on the first sub-group of odd-row data signals plus a sub-group of even-row interpolated-data signals obtained via the interpolation process to a display area in a first side of the display panel with a same image-resolution as the frame of image based on the group of source data signals and displaying a frame of image based on the second sub-group of even-row data signals after interpolation process to a display area in a second side of the display panel with a same image-resolution as the frame of image based on the group of source data signals.

Optionally, the display panel includes at least two display areas. Each of the at least two display areas is controlled by a respective one of multiple scan units connected to multiple gate lines and a respective one of multiple drive units connected to multiple data lines to independently configured to display a frame of sub-image. Each of the at least two display areas includes multiple gate lines independently connected to a respective one of multiple scan units and multiple data lines independently connected to a respective one of multiple drive units. The step of splitting the group of source data signals into at least two sub-groups of data signals includes a sub-step of splitting the group of source data signals into the at least two sub-groups of data signals respectively corresponding to the at least two display areas, and another sub-step of transmitting the at least two sub-groups of data signals respectively to the at least two display areas to display respective frames of sub-images thereof.

Optionally, the step of controlling the display panel to display a frame of image based on the at least two sub-groups of data signals includes a sub-step of controlling the respective one of the multiple scan units to sequentially turn on the multiple gate lines of associated with a respective one of the at least two display areas corresponding to a respective one of the at least two sub-groups of data signals, and another sub-step of controlling the respective one of the multiple drive units to transfer the respective one of the at least two sub-groups of data signals respectively to the multiple data lines. The at least two display areas are configured to display the respective frames of sub-images simultaneously, thereby displaying the frame of image in the display panel.

In still another aspect, the present disclosure provides a computer-program product including a non-transitory tangible computer-readable medium having computer-readable instructions thereon. The computer-readable instructions are executable by a processor to cause the processor to perform receiving a group of source data signals corresponding to a frame of image; splitting the group of source data signals into at least two sub-groups of data signals; converting signal format of a respective one of the at least two sub-groups of data signals to a displayable format corresponding to a display panel; transmitting the respective one of the at least two sub-groups of data signals in the displayable format to the display panel; and controlling the display panel to display a frame of image based on the at least two sub-groups of data signals.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

To drive a display apparatus for displaying images with super-high image-resolution with fine display effect and quality, huge amount of source data signals must be supplied. For example, AR/VR display module or high-resolution multi-screen near-field display module or high-resolution splitter module, these display apparatuses have high demands on data processing capability. Usually, multiple display port (DP) lines are needed to transfer data signals during operation. Accordingly, the display-driving card in the personal computer for supplying the source data also needs multiple DP interfaces to support the display apparatus. At the same time, the personal computer is also required to be a high-performance one because of huge demands on rendering of high-resolution image data, making it not suitable for using regular consumer-level personal computer.

Accordingly, the present disclosure provides, inter alia, a display-driving apparatus, a display apparatus having the same, and a method for driving the display apparatus thereof that substantially obviate one or more of the problems due to limitations and disadvantages of the related art. In one aspect, the present disclosure provides a display apparatus for near-field display application. The near-field display apparatus includes but not limited to Augmented-Reality glasses, Virtual-Reality glasses, or smart glasses, or similar equipment that contains a display screen being placed near user's eyes (usually within a distance of 20 centimeters).

Figure 1:
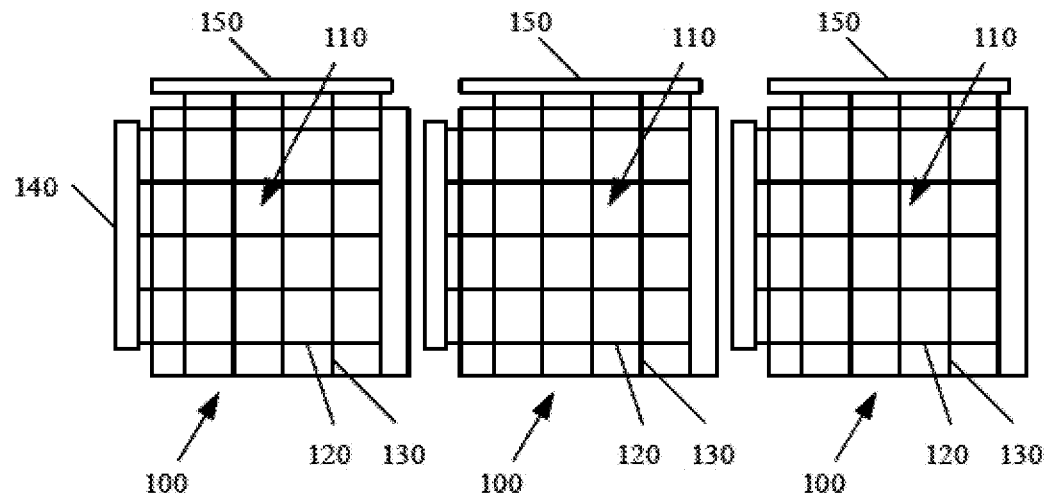
FIG. 1 is a schematic structural diagram of a near-field display apparatus according to an embodiment of the present disclosure.

FIG. 1 a schematic structural diagram of a near-field display apparatus according to an embodiment of the present disclosure. Referring to FIG. 1, the near-field display apparatus includes at least two patched display panels 100, each of which has a relatively small form factor. For example, each display panel can be a silicon-substrate-based organic light-emitting diode (SI-OLED) display panel. In FIG. 1, there are three such display panels laid laterally. Each display panel 100 includes at least one display area 110. Each display area 110 is laid with multiple gate lines 120 independently connected to a corresponding scan unit 140. Each display area 110 is also laid with multiple data lines 130 independently connected to a corresponding drive unit 150. Different display area has different scan unit and drive unit.

In case that each display panel 100 has only one display area, the display panel 100 includes one scan unit 140 and one drive unit 150. The work principle and structure of the display panel 100 is substantially similar to regular OLED display panel.

Figure 2:
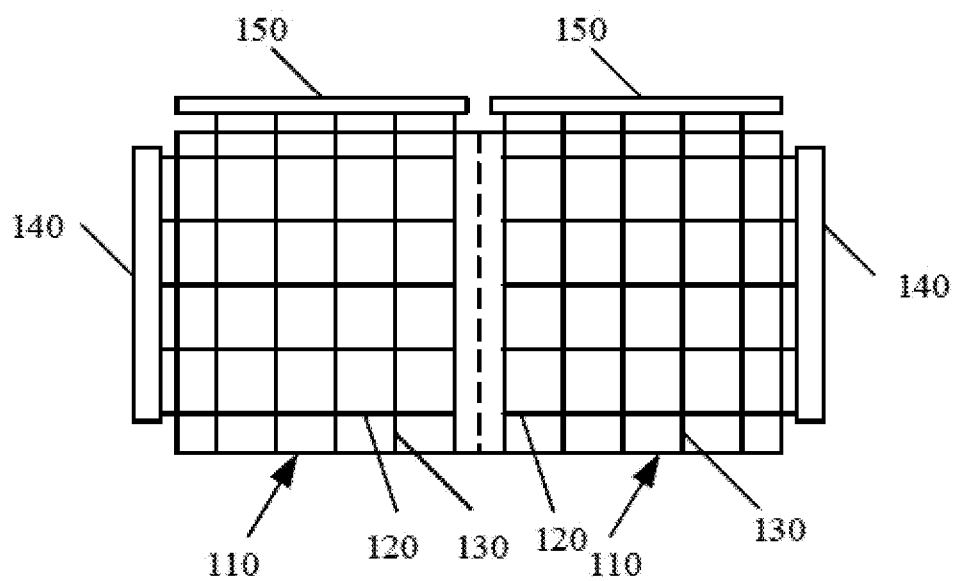
FIG. 2 is a schematic diagram of a display panel according to an embodiment of the present disclosure.
Figure 3:
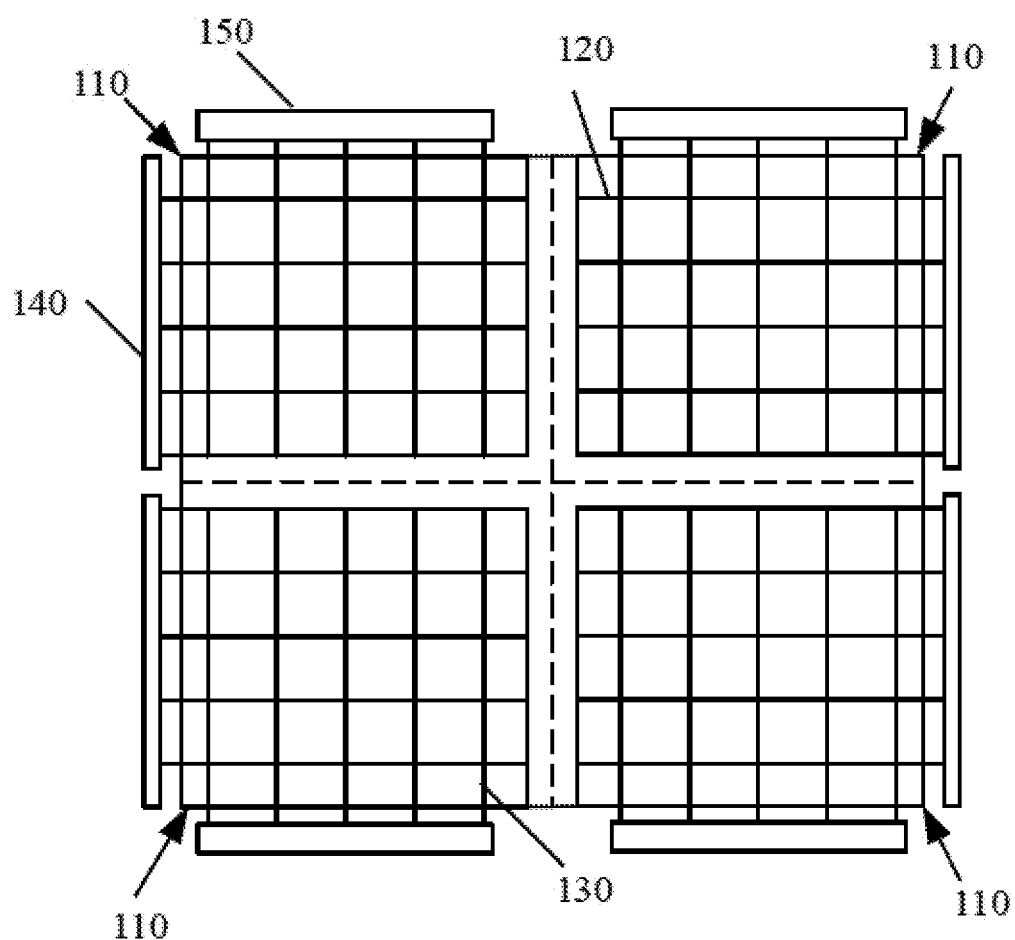
FIG. 3 is a schematic diagram of a display panel according to another embodiment of the present disclosure.

FIG. 2 is a schematic diagram of a display panel according to an embodiment of the present disclosure. FIG. 3 is a schematic diagram of a display panel according to another embodiment of the present disclosure. Referring to FIG. 2 and FIG. 3, each display panel 100 includes multiple display areas. In other words, each display panel 100 includes multiple scan units 140 and multiple drive units 150. Each scan unit 140 corresponds to one display area 110 and is configured to scan through multiple gate lines laid in this display area 110. Each drive unit 150 corresponds to one display area 110 and is configured to drive (by transmitting image data) image display in this display area 110.

Because the multiple gate lines 120 and the multiple data lines 130 in each display area 110 are independent to each other, respective one of the multiple scan units 140 and respective one of the multiple drive units 150 can be operated independently. In other words, the gate lines 120 in different display areas 110 can be scanned simultaneously and the data lines 130 in different display areas 110 can also be driven at the same time.

In a specific embodiment, in order to facilitate laying out the gate lines 120 and data lines 130 in each display area 110, different display area is laid along an extended direction of either the gate lines 120 or data lines 130. Optionally, the display panel 100 can be laid with two patched display areas 110 along the extension direction of the data lines 130. This display panel with the patched display areas, comparing with existing display panels having same total form factor and overall image-resolution (within proximate error ranges), has shorter data lines 130 connected to each display area. In this case, image data signals supplied to the display panel can be split into an upper half and a lower half along the extension direction of the data lines 130 and the upper half of the image data signals is supplied to the upper display area 110 while the lower half of image data signals is supplied to the lower display area 110.

Referring to FIG. 2, the display panel 100 can also be split into at least two display areas along extended direction of gate lines 120. This display panel, comparing with existing display panels having same total form factor and overall image-resolution (within proximate error ranges), has shorter gate lines 120 connected to each display area. Thus, image data signals supplied to the display panel can be split into a left half and a right half along the extension direction of the gate lines 120 and the left half of the image data signals is supplied to the left display area 110 while the right half of image data signals is supplied to the right display area 110.

Referring to FIG. 3, the display panel 100 can also be split into at least two display areas 110 along both the extended directions of the gate lines 120 and the data lines 130. In this case, comparing with existing display panels having same total form factor and overall image-resolution, this display panel can have shorter gate lines 120 and shorter data lines 130. Correspondingly, the image data signals supplied to this display panel can be split respectively to correspond to four different display areas 110 thereof.

In general, for a small form factor near-field display apparatus, the display panel can be split into even smaller display areas, each display area is associated with even shorter gate lines and data lines for supporting even faster image processing speed provided that other hardware conditions remain unchanged. The near-field display apparatus provided according to this embodiment can support image data signals for displaying images with higher refreshing-rate or image-resolution. Optionally, the more display areas in the display apparatus, the faster it can process respective image display and the higher in image quality it can support. For near-field display apparatus like AR/VR glasses, it is preferred to select a display panel including multiple display areas each with a smaller form factor to achieve higher quality for overall image display while keeping other hardware cost the same or lower.

Optionally, the near-field display apparatus also includes a power-supply module and a controller (which can be microcontroller unit or MCU). Optionally, the power-supply module can be DC/DC current source for providing power for driving circuit, microprocessor, and display panel. The controller is configured to control different components, driving circuits including display panel driving circuit, converter, demultiplexer, etc, and to control parameter setting and data writing and reading.

Optionally, the display apparatus also includes an Inertial measurement unit (IMU) for measuring real-time motion data. IMU collects these data to be stored and processed in the microprocessor before sending to several down-stream auxiliary devices.

Figure 4:
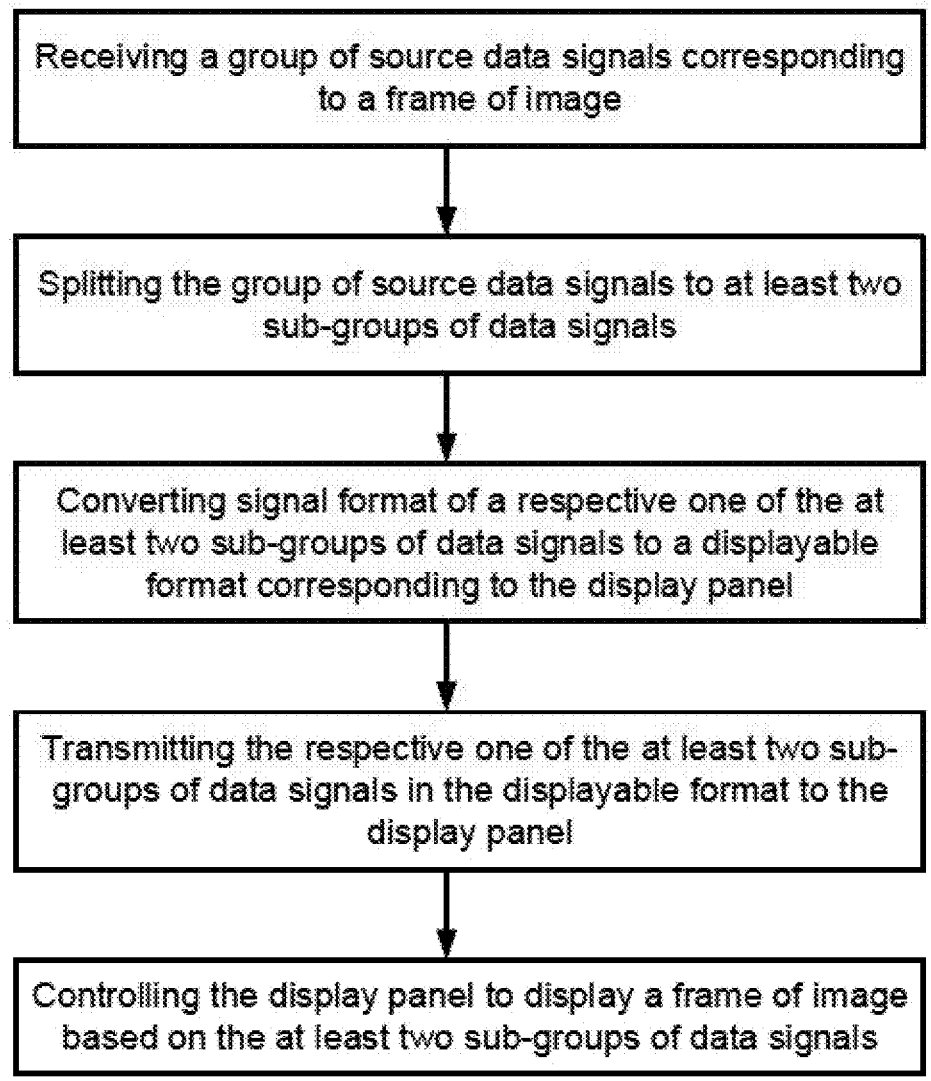
FIG. 4 is a flow chart illustrating a display-driving method according to an embodiment of the present disclosure.

FIG. 4 shows a display-driving method for driving a display panel according to some embodiments of the present disclosure. This method can be applied for driving the display panel in the near-field display apparatus mentioned above. It also can be applied to regular patched display apparatus and simultaneously drives multiple display panels of the display apparatus. Optionally, it applies to drive a display panel having multiple display areas.

Figure 5:
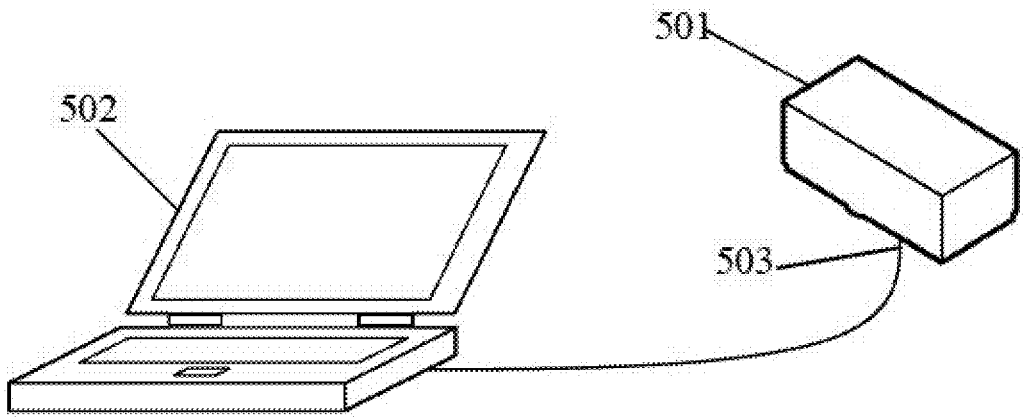
FIG. 5 is a schematic diagram of a VR display apparatus connected to a computer according to an embodiment of the present disclosure.

Referring to FIG. 4, the display-driving method includes a step of receiving a group of source data signals corresponding to a frame of image. Optionally, the group of source data signals is supplied from an auxiliary device such as a personal computer via a wired connection or from a cloud server or hot spot via a wireless connection or other storage devices. For example, as shown in FIG. 5, the display panel is a part of a VR device 501 which is connected to a computer 502 via a display port 503. The computer 502 supplies the source data signals. The VR device 501 also can receive the source data signals from a cloud server via wired or wireless interfaces or obtained from a network hot spot. Further, the method includes a step of splitting the group of source data signals into at least two sub-groups of data signals. Each sub-group of data signals includes data signals corresponding to a sub-image to be displayed in part of display panel.

Additionally, the method includes a step of converting signal format of a respective one of the at least two sub-groups of data signals to a displayable format corresponding to the display panel. In general, a display format of video data signals that can be processed and displayed by the display panel is different from a transmission format of these data signals. For example, the display format of video data signals that can be directly processed and displayed is in $I^2C$ format at a particular voltage level. If a display port (DP) line is a signal line used for the display panel, each sub-group of data signals can only be displayable after it is converted to the $I^2C$ format. Optionally, the transmission format can be chosen depending on specific interface and hardware terminal settings.

Further, the method includes a step of transmitting the respective one of the at least two sub-groups of data signals in the displayable format to the display panel before performing a step of controlling the display panel to display a frame of image based on the at least two sub-groups of data signals. Optionally, each of the at least two sub-groups of data signals can be further processed separately and simultaneously before being displayed in respective display areas of the display panel. Even though each sub-group can have different processing speed, in general less time is needed for processing all sub-groups of data signals under the condition that rest conditions of operation remain the same. On one hand, as the signal processing speed is raised, the display panel can support higher refreshing-rate or image-resolution associated with the data signals, even though it is not involved with direct enhancement of hardware performance. On the other hand, for displaying an image with a same quality, the proposed method can effectively reduce data amount of source data signals so as to cut down numbers of data lines of supporting equipment that are connected to the display panel, facilitating its applicability of the display panel.

Furthermore, the method includes a step of controlling the display panel to display a frame of image based on the at least two sub-groups of data signals. Optionally, the display panel includes at least two display areas. Each display area is configured with multiple gate lines and multiple data lines and is associated with a separate scan unit and a separate drive unit. Within each display area, the multiple gate lines are independently coupled to the corresponding one scan unit and the multiple data lines are independently coupled to the corresponding one drive unit. The step of controlling the display panel to display a frame of image based on the at least two sub-groups of data signals includes a sub-step of controlling the respective one scan unit to sequentially turn on the multiple gate lines associated with a respective one of the at least two display areas corresponding to a respective one of the at least two sub-groups of data signals that are transmitted in the previous step. Additionally, the step of controlling includes a sub-step of controlling the respective one drive unit to transfer the respective one of the at least two sub-groups of data signals respectively to the multiple data lines. Moreover, the step of controlling includes a sub-step of controlling the at least two display areas to display the respective frames of sub-images simultaneously based on the respective at least two sub-groups of data signals, thereby displaying the frame of image in the display panel.

Figure 6:
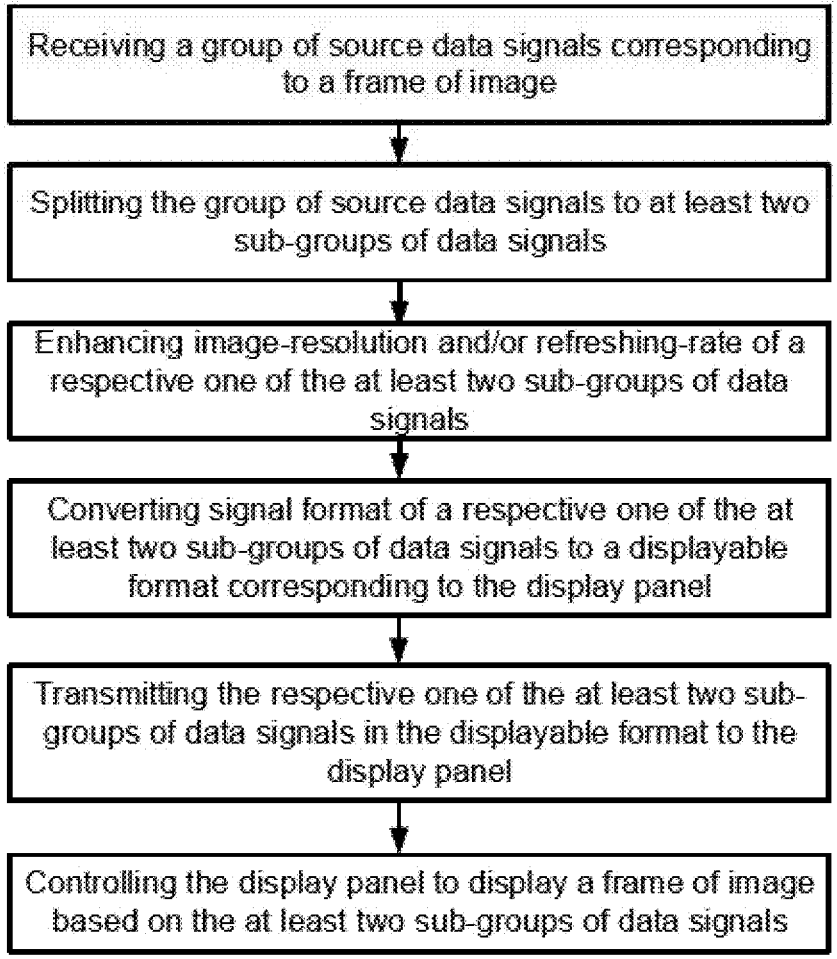
FIG. 6 is a flow chart illustrating a display-driving method according to another embodiment of the present disclosure.

FIG. 6 is a flow chart illustrating a display-driving method according to another embodiment of the present disclosure.

Referring to FIG. 6, similar to the FIG. 4, the method includes a step of receiving a group of source data signals corresponding to a frame of image. This step includes storing the group of source data signals in a storage device. Optionally, the storing process is a process of writing data into the storage device or a memory. Optionally, the memory can be selected from a random access memory (RAM) and stores the group of source data signals to specific spaces thereof with respective addresses recorded. Then, the method includes a step of splitting the group of source data signals into at least two sub-groups of data signals. Optionally, the step of splitting includes a process of selectively reading part of data originally stored in the storage device according to their addresses. Optionally, a bipolar random access memory (BRAM) scheme is used. Optionally, a first-in first out (FIFO) scheme is used. Additionally, referring to FIG. 6, the method further includes a step of performing signal processing to the respective one of the at least two sub-groups of data signals. Optionally, the signal processing includes enhancing image-resolution and/or refreshing-rate of the respective sub-groups of data signals. Other steps of the method shown in FIG. 6 are the same as those in the method shown in FIG. 4.

Optionally, the step of splitting includes a sub-step of splitting the group of source data signals firstly into at least two sub-groups of first-stage sub-group data signals. Optionally, it includes a sub-step of splitting each of the at least two sub-groups of first-stage sub-group data signal into at least two sub-groups of second-stage sub-group data signals. Optionally, each sub-group of data signals, or specifically each second-stage sub-group data signals, corresponds to a respective display area of the display panel for displaying a respective frame of sub-image thereof. Optionally, all sub-steps of the splitting step are performed at a same time or in one time. For example, for splitting a group of source data signals corresponding a frame of image to be displayed in a display panel shown in FIG. 3, the group of source data signals can be split in one time into four sub-groups of data signals respectively corresponding to the four different display areas thereof.

Figure 7:
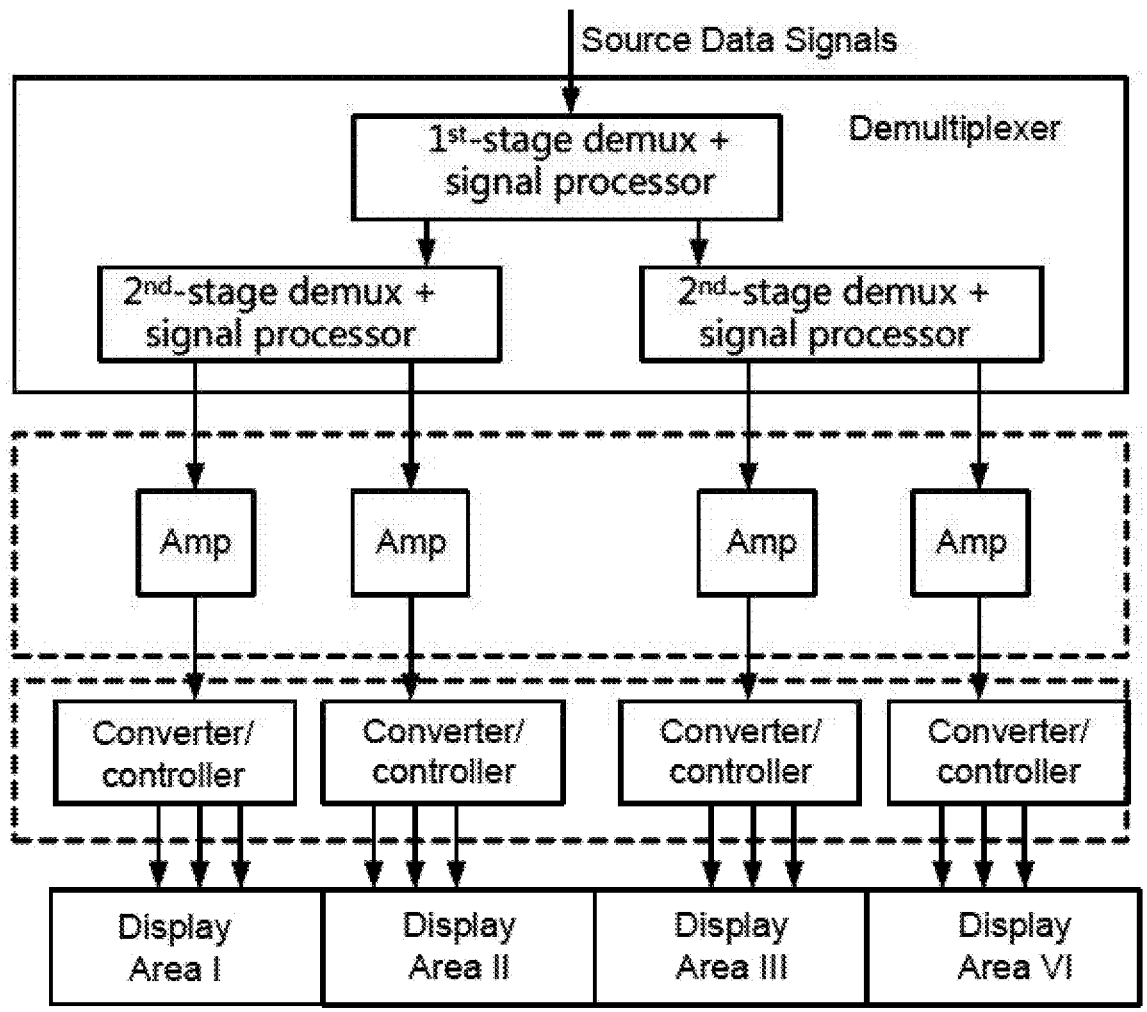
FIG. 7 is a schematic diagram illustrating a display-driving apparatus for implementing the display-driving method according to an embodiment of the present disclosure.
Figure 8:
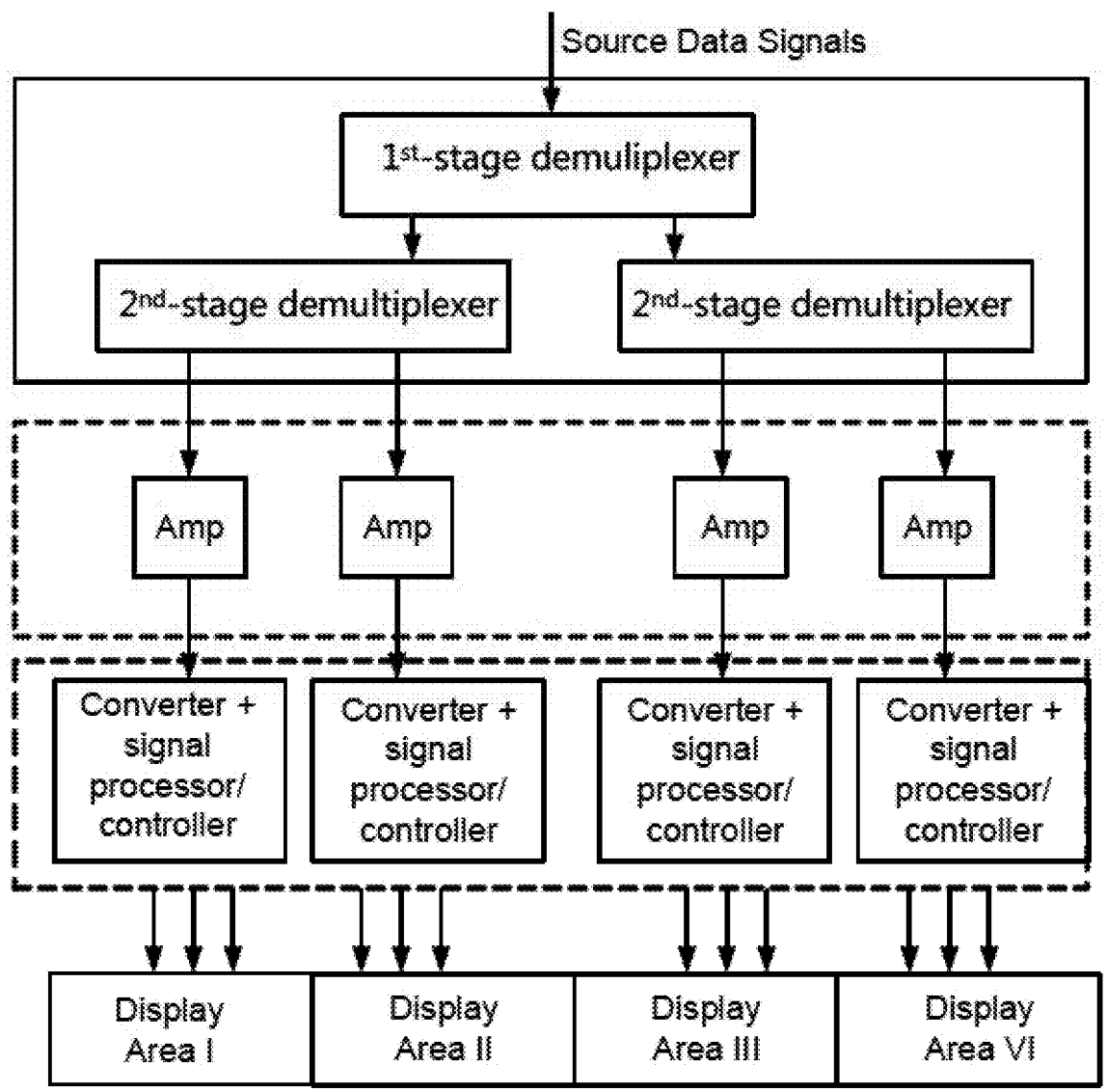
FIG. 8 is a schematic diagram illustrating a display-driving apparatus for implementing the display-driving method according to another embodiment of the present disclosure.

In another aspect, the present disclosure provides a display-driving apparatus configured to implement the display-driving method (FIG. 4 and FIG. 6) on a display panel having at least two display area. FIG. 7 and FIG. 8 are schematic diagrams illustrating a display-driving apparatus for implementing the display-driving method according to some embodiments of the present disclosure. Referring to FIG. 7, the display-driving apparatus includes at least a demultiplexer for receiving the group of source data signals and performing the step of splitting the source data signals into at least two sub-groups of data signals. Additionally, the display-driving apparatus includes at least a converter for converting data format of the data signals (including each sub-group of data signals) to a displayable format. Further, it includes at least a controller for controlling transmission of the at least two sub-groups of data signals with displayable format to respective display areas correspondingly divided out of the display panel for displaying respective frame of sub-images.

Optionally, the demultiplexer includes a first-stage demultiplexer and one or more second-stage demultiplexer. The first-stage demultiplexer is configured to perform a sub-step of firstly splitting the group of source data signals into at least two sub-groups of first-stage sub-group data signals. For example, the two sub-groups includes an upper first-stage sub-group data signals and a lower first-stage sub-group data signals, assuming the splitting is done to obtain an upper-half and a lower-half respectively corresponding to a first display area at an upper-half of the display panel and a second display area at a lower-half of the display panel. Then, the second-stage demultiplexer is configured to perform a sub-step of splitting one of the first-stage sub-group data signals into at least two second-stage sub-group data signals. For example, the upper first-stage sub-group is split into a left-upper second-stage sub-group and a right-upper second-stage sub-group and the lower first-stage sub-group is split into a left-lower second-stage sub-group and a right-lower second-stage sub-group. Overall, the group of source data signals is split into a left-upper sub-group, a right-upper sub-group, a left-lower sub-group, and a right-lower sub-group of data signals. Each of these sub-groups of data signals respectively corresponds to one of the four different display areas, i.e., Display Area I, Display Area II, Display Area III, and Display Area VI, where each of these sub-groups of data signals with displayable format can be driven to display a respective frame of sub-image.

Referring to FIG. 7, optionally, the demultiplexer, or particularly each of the first-stage demultiplexer and the second-stage demultiplexers includes a signal processor configured to perform the step of enhancing image-resolution and/or refreshing-rate of a respective one of the at least two sub-groups of data signals (FIG. 6). Multiple splitting reduces the amount of data signals that need to be processed for each sub-group. Under a condition of keeping the source data signals unchanged, the step of enhancing can make the combined frame of sub-images displayed on the display panel with better quality. For example given the same refreshing-rate for each sub-group of data signals while doubling the image-resolution, the frame of image actually displayed on the display panel can have twice higher image resolution than an image based on source data signals without need to transmitting twice amount of data signals from source to the display panel.

Optionally, the display-driving apparatus also includes an amplifier configured to strengthen each sub-group of data signals after the step of splitting and before the step of converting. Optionally, this step is executed only when the data signal attenuation (along the path of transmission) is greater than a threshold. Optionally, one amplifier is associated with each of multiple second-stage demultiplexers. Optionally, one amplifier is used for processing all sub-groups of data signals after splitting. Optionally, the controller is included or coupled with the converter to perform the step of controlling the display panel to display a frame of image based on the at least two sub-groups of data signals after they are converted to displayable format by the converter. Each of these sub-groups of data signals, being processed, amplified, and converted with displayable format, is then transmitted to respective one of the four different display areas, i.e., Display Area I, Display Area II, Display Area III, and Display Area VI to display a respective frame of sub-image. Each frame of sub-image can be displayed with high-quality high-resolution. But, the source data signals needed for displaying these four frames of sub-images high-quality high-resolution were delivered not via four display port (DP) lines as some related apparatus but via a single display port (DP) line. Accordingly, all frames of sub-images have enhanced image-resolution and/or refreshing-rate at least comparable with or even better than the regular frame of image based on the source data signals.

Referring to FIG. 8, in an alternative embodiment the display-driving apparatus includes a signal processor included or coupled with the converter and the controller. The signal processor is configured to perform the step of enhancing image-resolution and/or refreshing-rate of a respective one of the at least two sub-groups of data signals (FIG. 6) after it is split and amplified with strengthen signal and before or during the step of converting its format to displayable format. Each of these sub-groups of data signals, being processed, amplified, and converted with displayable format, is then transmitted to respective one of the four different display areas, i.e., Display Area I, Display Area II, Display Area III, and Display Area VI to display a respective frame of sub-image. Accordingly, all frames of sub-images have enhanced image-resolution and/or refreshing-rate at least comparable to the frame of image based on the source data signals. Each frame of sub-image can be displayed with high-quality high-resolution. But, the source data signals needed for displaying these four frames of sub-images high-quality high-resolution were delivered not via four display port (DP) lines as some related apparatus but via a single display port (DP) line. Accordingly, all frames of sub-images have enhanced image-resolution and/or refreshing-rate at least comparable with or even better than the regular frame of image based on the source data signals.

Figure 9:
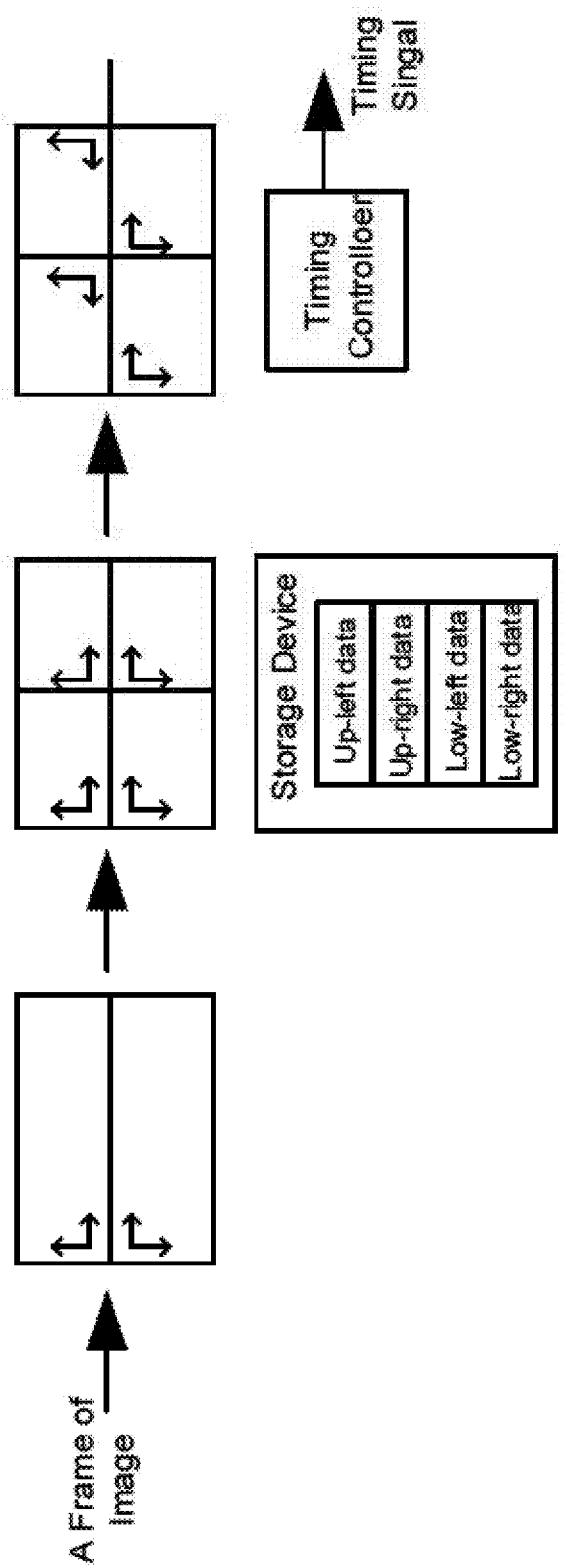
FIG. 9 is a schematic diagram illustrating a process of storing a group of source data and splitting the group into multiple sub-groups according to an embodiment of the present disclosure.

FIG. 9 is a schematic diagram illustrating a process of storing a group of source data and splitting the group into multiple sub-groups according to an embodiment of the present disclosure. Referring to FIG. 9, the step of receiving the group of source data signals is to store or write the group of source data into a storage medium, e.g., a DDR memory, corresponding to store a frame of image. Optionally, the DDR memory is configured to be able to store at least three frames of images in order to ensure that the signal processing of the whole group of source data can be continuously performed in time without interruption. The operation of writing the group of source data signals is performed to write the respective one of the group of source data signals to a respective writing/reading address. The W/R address includes information of frame index of writing-in data (which is counted for each frame and is reset to zero after the storage medium is full with at least three frames of data being stored), column address, and row address, etc. The W/R address makes it convenient to process and analyze the data. Optionally, the storage process is performed according to a nominal (address-writing) sequence, e.g., from left to right, or from up to down, to save respective one of the group of source data signals to respective address.

Additionally, the step of splitting the group of data signals corresponds to reading respective sub-groups of data signal from the storage medium according to an address-reading sequence based on how the splitting is performed. Referring to FIG. 9, the splitting includes sub-steps of splitting the group into, e.g., two, upper and lower, sub-groups as indicated by the folded arrows to show address-reading sequences in each display area. In an implementation, reading the data is based on the address-reading sequences. Optionally, reading data according to row address includes reading data from left to right. Optionally, column address is set to start from middle column. Column address index number gradually decreases in upper half sub-group and gradually increases in lower half sub-group.

Referring to FIG. 9, splitting into two left-right sub-groups is similar to splitting into two upper-lower sub-groups to selectively obtain the sub-group of data signals based on address-reading sequences. For example, reading data according to row address includes reading data from left to right. Optionally, column address is set to start from middle column. Column address index number gradually decreases in upper half sub-group and gradually increases in lower half sub-group.

Furthermore, the reading data following the address-reading sequence according to the addresses stored in the storage medium is based on display sequence correspondingly. The data read out is for outputting image information and for generating corresponding driving signals including timing signals provided by a timing-generation module. Specifically, the driving signals includes row-synchronize signal (HS), field-synchronize signal (VS), and data-select signal (DE), etc. Of course, the address-reading sequences are not fixed but depended how different display areas are patched together in the display panel and how different sub-groups of data signals corresponding to different display areas are stored in the storage medium according to their addresses. For a display panel having multiple independent display areas, the multiple sub-groups of data signals that were split from original group of source data signals will be transmitted to respective display areas with image information as well as driving signals for controlling the corresponding display areas to display respective frame of sub-images.

In a specific embodiment, the step of splitting the group of source data signals includes splitting the group of source data signals into a first sub-group of odd-row data signals and a second sub-group od even-row data signals. Each of the first sub-group of odd-row data signals and the second sub-group od even-row data signals can be applied to display a frame of sub-image in a regular display panel or more suitably applied to display a frame of sub-image in respective two sides of a double-side transparent display panel.

Figure 10:
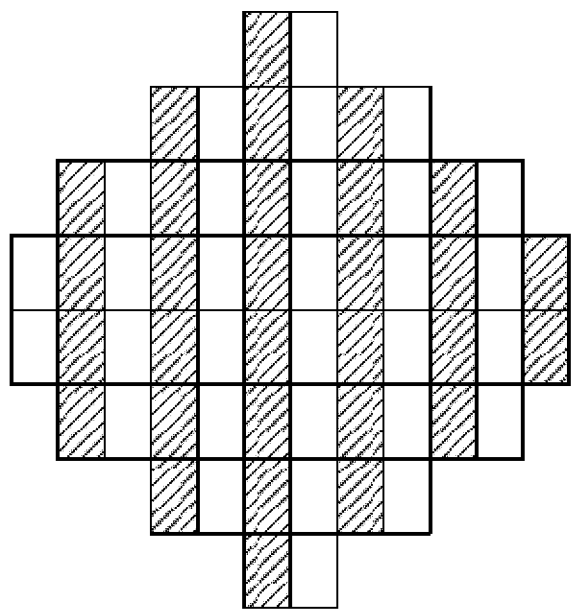
FIG. 10 is a schematic diagram of data-splitting for displaying in a double-side transparent display panel according to an embodiment of the present disclosure.

FIG. 10 is a schematic diagram of data-splitting for displaying in a double-side transparent display panel according to a specific embodiment of the present disclosure. For a double-side transparent display panel, an image displayed at one side of the display panel can also be seen from the other side. But, due to limitation of its transparency, the image quality viewed from the other side is slightly reduced. As the present disclosure, the group of source data signals corresponding to a frame of image are split into an odd-row sub-group and an even-row sub-group. Referring to FIG. 10, the unfilled region represents a front side of the double-side transparent display panel and is used for displaying a frame of sub-image based on the odd-row sub-group of data signals. The shaded region represents a back side of the double-side transparent display panel and is used for displaying another frame of sub-image based on the even-row sub-group of data signals. In this way, images displayed at both sides are effectively enhanced with better uniformity.

Additionally, the display-driving method can also be applied to perform an interpolation process to each of the odd-row sub-group of data signals and the even-row sub-group of data signals. Optionally, the interpolation process is part of the step of signal processing for enhancing image-resolution of a respective one of the at least two sub-groups of data signals (FIG. 6) performed by the signal processor in the display-driving apparatus (FIG. 7 and FIG. 8). Optionally, the interpolation process to generate a sub-group of even-row interpolated-data signals for compensating the odd-row sub-group of data signals on the front side and generate a sub-group of odd-row interpolated-data signals for compensation the even-row sub-group of data signals. For example, an even-row sub-group data signal should be between any two neighboring odd-row sub-groups of data signals. It's value also should be substantially close to that of each neighboring odd-row sub-group data signal. Approximately, the value of the even-row sub-group data signal can be set to be equal to an interpolated value of the two corresponding neighboring odd-row sub-groups data signals. Therefore, as the data interpolation process is introduced for either the first odd-row sub-group of data signals or the second even-row sub-group of data signals, each displayed frame of sub-image at either side of the double-side display panel can substantially recover the image-resolution of the frame of image based on original group of source data signals, effective enhancing display quality.

Figure 11:
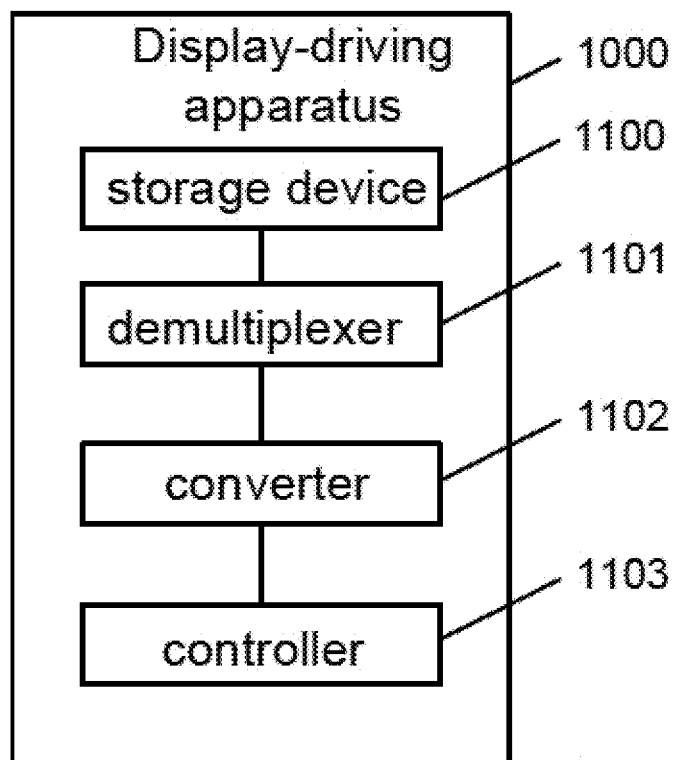
FIG. 11 is a block diagram of a display-driving apparatus according to an embodiment of the present disclosure.

FIG. 11 shows a block diagram of a display-driving apparatus according to an embodiment of the present disclosure. Referring to FIG. 11, the display-driving apparatus 1000 includes a storage device 1100 for saving the group of source data signals received from an external source such as a personal computer, a cloud server, or a hot spot. The storage device 1100 is configured to store each data signal according to a specific address located at a specific space (of a memory). Optionally, the storage device is a DDR memory and is configured to have capacity for storing at least three full frame of image data. Optionally, the writing/reading scheme of the storage device includes BRAM or FIFO or others.

Referring to FIG. 11, the display-driving apparatus 1000 further includes one or more demultiplexers 1101 configured to split the group of source data signals into at least two sub-groups of data signals. Optionally, as shown in FIG. 7 and FIG. 8, the demultiplexer 1101 includes a first-stage demultiplexer and optionally several more second-stage demultiplexer, which are configured to perform multiple stages of splitting. The first-stage demultiplexer is configured to split the group of source data signals into at least two sub-groups of first-stage sub-group data signals. Each second-stage demultiplexer is configured to split the respective one sub-group of first-stage sub-group data signals into at least two sub-groups of second-stage sub-group data signals. In an embodiment, the demultiplexer 1101 performs the splitting by selectively reading part (i.e., a respective one sub-group) of the group of source data signals out of the storage device 1100 according to the respective addresses stored thereof. Optionally, the splitting is to divide the group of source data signals to the at least two sub-groups of data signals respectively based on locations of the at least two display areas of the display panel. The addresses for those sub-groups of data signals saved in the storage device 1100 are retrieved to read out the data accordingly to generate the respective sub-group of data signals corresponding to respective display area. In a specific embodiment, the splitting can divide the group of source data signals to a first sub-group of odd-row data signals and a second sub-group of even-row data signals. Optionally, the first sub-group of odd-row data signals is processed and transmitted to be displayed on a first side of a double-side transparent display panel and the second sub-group of even-row data signals is processed and transmitted to be displayed on a second side of the double-side transparent display panel.

Referring to FIG. 11 again, the display-driving apparatus 1000 also includes a converter 1102 configured to convert data format of each sub-group of data signals to displayable format that is compatible with the display panel. Furthermore, the display-driving apparatus 1000 includes a controller 1103 configured to transmit each sub-group of data signals to the respective display area of the display panel and to control the respective display area to simultaneously display a frame of sub-image thereof effectively displaying a frame of image on the whole display panel. Optionally, the converter 1102 and the controller 1103 can be configured in a single device or separately in multiple units. Each converter 1102 can be used for performing format converting for one group or multiple sub-groups of data signals. In a specific embodiment, as the group of source data signals corresponding to one frame of image is split into a first sub-group of odd-row data signals and a second sub-group of even-row data signals the controller is configured to display a first frame of sub-image at a first side of a double-side display panel based on the first sub-group of odd-row data signals and display a second frame of sub-image at a second side of the double-side display panel based on the second sub-group of even-row data signals.

Optionally, the display-driving apparatus 1000 includes a signal processor 1104 (see FIG. 12) as an independent component or coupled within the demultiplexer 1101 or the converter 1102. Optionally, the signal processor 1104 is configured to perform data process on each sub-group of data signals aiming to enhance image-resolution and/or refreshing-rate. As the data amount in each sub-group of data signals is much smaller than the source data signals. The calculation power for such signal processing is reduced, thereby diminishing demands for expensive hardware updating in the display-driving apparatus 1000. Optionally, the signal processor includes an interpolation processor configured to perform an interpolation to the first sub-group of odd-row data signals and/or the second sub-group of even-row data signals so that the image-resolution of the respective odd-row data signals and/or even-row data signals is enhanced in each displayed frame of sub-image at each side of the display panel to at least the same image-resolution associated with the source data signals.

Figure 12:
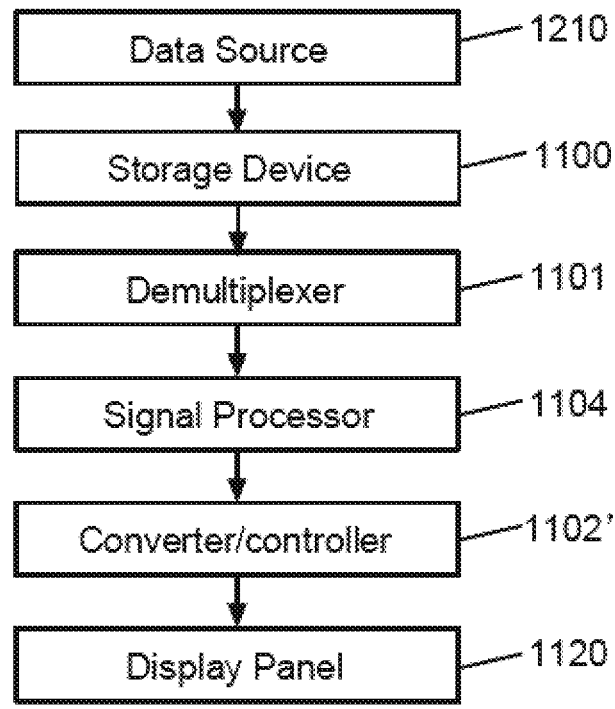
FIG. 12 is a schematic diagram of data signal transmission process through the display-driving apparatus according to an embodiment of the present disclosure.
Figure 13:
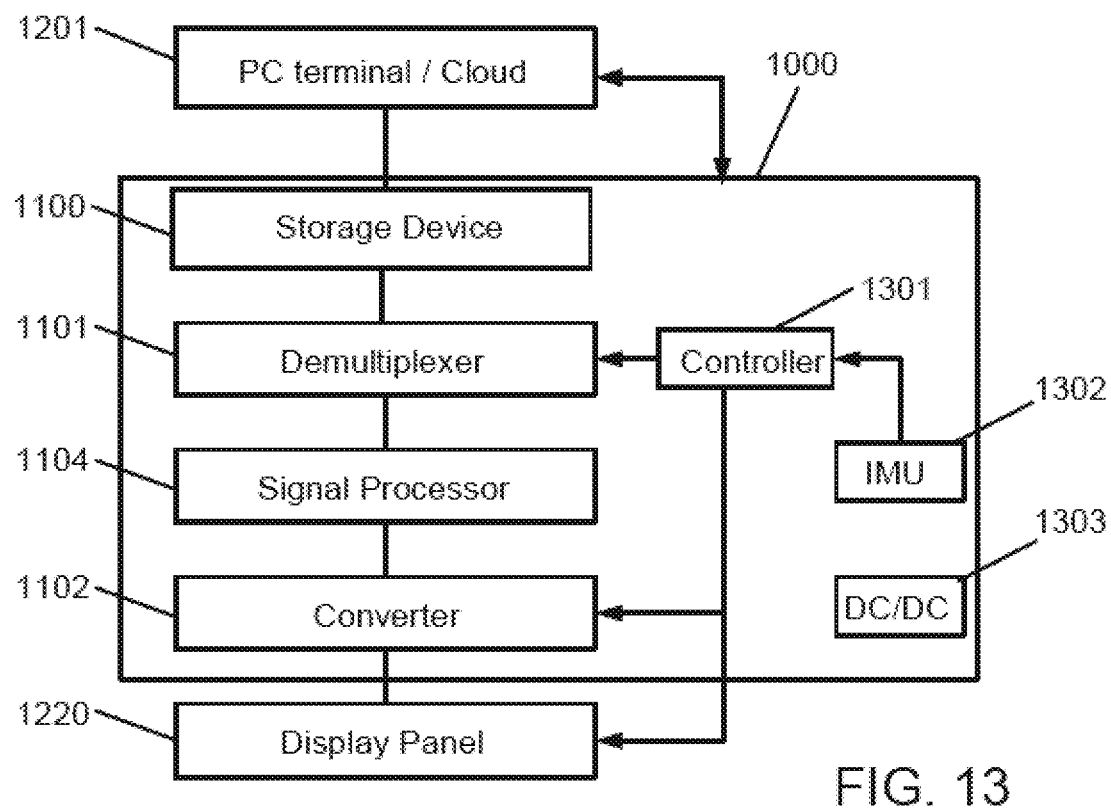
FIG. 13 is a block diagram of a display apparatus connecting to several auxiliary devices according to an embodiment of the present disclosure.

FIG. 12 is a schematic diagram of data signal transmission process through the display-driving apparatus according to an embodiment of the present disclosure. FIG. 13 is a block diagram of a display apparatus connecting to several auxiliary devices according to an embodiment of the present disclosure. Referring to FIG. 12, the group of source data signals is provided from a data source 1210 which is one of several backend devices for the display-driving apparatus. For example, the data source 1210 may be a PC terminal or a Cloud Server terminal. The source data signals from the data source 1210 corresponds to data for being displayed as a frame of image on a display panel 1120. Once the group of source data signals is received, it is stored in a storage device 1100. Optionally, the storage device 1100 is a memory device such as a DDR memory. The group of source data signals is then split by a demultiplexer 1101 to at least two sub-groups of data signals. Optionally, the split is based on locations of multiple display areas of the display panel 1120 where different sub-group of data signals split from the group of source data signals is correspondingly for displaying a frame of sub-image thereof. After splitting, each sub-group of data signals can be optimized/processed by a signal processor 1104 to enhance image-resolution and/or refreshing-rate for respective frame of sub-image to be displayed. Optionally, the signal processor 1104 can be configured to be an amplifier to strengthen or amplify power levels of each sub-group of data signals whose signal attenuations are larger than a threshold value.

Further, after splitting and signal processing or signal optimizing or signal amplifying, each sub-group of the data signals can be processed by the converter/controller 1102' to perform a data format conversion. The converter/controller 1102' converts transmission data format to displayable data format that is compatible to the display panel 1120.

Furthermore, each sub-group of data signals with displayable format is transmitted to respective one of display area of the display panel 1120. This process is controlled by the converter/controller 1102'.

Referring to FIG. 13, a display apparatus is provided to include the display-driving apparatus 1000 coupled to the backend device (a PC terminal or a Cloud server) 1201 to supply source data signals and display image at the frontend device (i.e., a display panel) 1220. The display-driving apparatus 1000 is substantially the same as one described in FIG. 11. Optionally, the display-driving apparatus 1000 includes a controller 1301 configured as a micro-control unit (MCU) coupled respectively to the PC/Cloud terminal 1201, demultiplexer 1101, converter 1102, and display panel 1220. The controller 1301 is configured to control splitting of the group of source data signals executed at the demultiplexer 1101, to control converting data format of each sub-group of data signals to a displayable format (such as $I^2C$ format) performed at the converter 1102, and also to control displaying each sub-group of data signals at respective display areas of the display panel 1220 corresponding respectively to the sub-groups of data signals. Optionally, the controller 1301 can also be configured to be one controller 1103 inside the display-driving apparatus 1000. Optionally, the controller 1301 can be an external controller, for example, a controller in a multiplexed display device.

Referring to FIG. 13, the display-driving apparatus 1000 includes an inertial measurement unit (IMU) 1302 for providing motion data. For example, the display apparatus is an Augmented-Reality (AR) display device or a Virtual-Reality (VR) display device, the displayed image needs to be adjusted based on user's motion. In actual implementation, the IMU 1302 collects motion data and transmits the motion data to the controller 1301. The controller 1301 is configured to process the motion data to adjust its controls to the demultiplexer 1101, converter 1102, and the display panel 1220 accordingly. Additionally, the display-driving apparatus 1000 includes a DC/DC power supply 1303.

Optionally, the display apparatus of FIG. 13 includes a storage device in which all computer programs executable at the controller or processor are stored. The computer programs include all instructions for performing steps of the display-driving method described herein.

In an alternative aspect, the present disclosure provides a computer-program product including a non-transitory tangible computer-readable medium having computer-readable instructions thereon. The computer-readable instructions are executable by a processor to cause the processor to perform at least a step of receiving a group of source data signals corresponding to a frame of image, a step of splitting the group of source data signals into at least two sub-groups of data signals, a step of converting signal format of a respective one of the at least two sub-groups of data signals to a displayable format corresponding to the display panel, a step of transmitting the respective one of the at least two sub-groups of data signals in the displayable format to the display panel, and a step of controlling the display panel to display a frame of image based on the at least two sub-groups of data signals.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display-driving apparatus for driving a display panel having at least two display areas, comprising:
   a storage device configured to receive and store a group of source data signals corresponding to a frame of image;
   a demultiplexer configured to split the group of source data signals into at least two sub-groups of data signals including a first sub-group of odd-row data signals and a second sub-group of even-row data signals;
   a converter configured to convert a signal format of a respective one of the at least two sub-groups of data signals to a displayable format corresponding to the display panel; and
   a controller configured to transfer the at least two sub-groups of data signals in the displayable format to respective at least two display areas of the display panel to display a frame of image; and
   an interpolation processor configured to perform an interpolation to the first sub-group of odd-row data signals and/or the second sub-group of even-row data signals;
   wherein the controller is configured to display a frame of sub-image at a first side of the display panel based on the first sub-group of odd-row data signals and to display a frame of sub-image at a second side of the display panel based on the second sub-group of even-row data signals;
   wherein the first sub-group of odd-row data signals and the second sub-group of even-row data signals are respectively converted to displayable format of the display panel;
   wherein image-resolution of a frame of image displayed at the first side based on the first sub-group of odd-row data signals plus a sub-group of even-row interpolated-data signals is made to be equal to image-resolution of a frame of image based on the group of source data signals; and/or
   image-resolution of a frame image displayed at the second side based on the second sub-group of even-row data signals plus a sub-group of odd-row interpolated-data signals is made to be equal to image-resolution of a frame of image based on the group of source data signals.

2. The display-driving apparatus of claim 1, wherein the demultiplexer comprises a first-stage demultiplexer configured to selectively read at least two sub-groups of first-stage sub-group data signals out of the group of source data signals according to respective addresses stored in the storage device to at least two second-stage demultiplexers, each of the at least two second-stage demultiplexers being configured to further split a respective one of the at least two sub-groups of first-stage sub-group data signals into at least two sub-groups of second-stages sub-group data signals.

3. The display-driving apparatus of claim 2, wherein the demultiplexer comprises a signal processor associated with each of the first-stage demultiplexer and the at least two second-stage demultiplexers and configured to process respective first-stage or second-stage sub-group data signals to enhance image-resolution and/or refreshing-rate of respective frame of sub-images to be displayed on the display panel.

4. The display-driving apparatus of claim 2, further comprising an amplifier configured to strengthen a respective one of first-stage sub-group data signals or a respective one of second-stage sub-group data signals to generate a respective one of strengthened sub-group data signals; and
wherein the converter comprises a signal processor configured to process the strengthened sub-group data signals to generate enhanced sub-group data signals with enhanced image-resolution and/or refreshing-rate of a frame of sub-image to be displayed in the display panel.

5. The display-driving apparatus of claim 1, further comprising a signal processor configured to process a respective one of the at least two sub-groups of data signals to enhance image-resolution and/or refreshing-rate of the frame of image displayed on the display panel.

6. The display-driving apparatus of claim 1, further comprising an amplifier configured to strengthen the respective one of the at least two sub-groups of data signals if signal attenuation thereof is greater than a threshold.

7. The display-driving apparatus of claim 1, wherein the display panel comprises multiple scan units and multiple drive units;
each of the at least two display areas is independently configured to display a frame of sub-image by a respective one of the multiple scan units and a respective one of the multiple drive units;
each of the at least two display areas is independently configured with multiple gate lines respectively connected to the respective one of the multiple scan units, and multiple data lines respectively connected to the respective one of the multiple drive units; and
the demultiplexer is configured to split the group of source data signals corresponding to a frame of image into at least two sub-groups of data signals respectively corresponding to a frame of sub-images to be displayed respectively in the at least two display areas.

8. The display-driving apparatus of claim 7, wherein the controller is configured to control the respective one of the multiple scan units to sequentially turn on the multiple gate lines associated with a respective one of the at least two display areas corresponding to a respective one of the at least two sub-groups of data signals;
to control the respective one of the multiple drive units to transfer the respective one of the at least two sub-groups of data signals respectively to the multiple data lines; and
to control the at least two display areas to display respective frames of sub-images simultaneously, thereby displaying the frame of image in the display panel.

9. A display apparatus comprising the display-driving apparatus of claim 1 having a single display port for receiving a group of source data signals.

10. The display apparatus of claim 9, wherein the display apparatus comprises a near-field display apparatus selected from a Virtual-Reality display apparatus and an Augmented-Reality display apparatus.

11. A method for driving a display panel comprising:
receiving a group of source data signals corresponding to a frame of image;
splitting the group of source data signals into at least two sub-groups of data signals;
converting signal format of a respective one of the at least two sub-groups of data signals to a displayable format corresponding to the display panel;
transmitting the respective one of the at least two sub-groups of data signals in the displayable format to the display panel; and
controlling the display panel to display a frame of image based on the at least two sub-groups of data signals;
wherein splitting the group of source data signals into at least two sub-groups of data signals comprises:
splitting the group of source data signals into a first sub-group of odd-row data signals and a second sub-group of even-row data signals;
performing an interpolation process to first sub-group of odd-row data signals and/or the second sub-group of even-row data signals to generate a sub-group of even-row interpolated-data signals associated with the first sub-group of odd-row data signals and/or a sub-group of odd-row interpolated-data signals associated with the second sub-group of even-row data signals; and
displaying a frame of image based on the first sub-group of odd-row data signals plus a sub-group of even-row interpolated-data signals obtained via the interpolation process to a display area in a first side of the display panel with a same image-resolution as the frame of image based on the group of source data signals and displaying a frame of image based on the second sub-group of even-row data signals after interpolation process to a display area in a second side of the display panel with a same image-resolution as the frame of image based on the group of source data signals.

12. The method of claim 11, wherein receiving the group of source data signals comprises storing the group of source data signals into a storage device with respective addresses; and
wherein splitting the group of source data signals into at least two sub-groups of data signals comprises selectively reading at least two sub-groups of first-stage sub-group data signals out of the group of source data signals according to the respective addresses stored in the storage device, and further comprises splitting a respective one sub-group of the first-stage sub-group data signals into at least two sub-groups of second-stage sub-group data signals.

13. The method of claim 12, further comprising strengthening the respective one of first-stage sub-group data signals or a respective one of second-stage sub-group data signals to generate a respective one of strengthened sub-group data signals; and
processing the strengthened sub-group data signals to generate enhanced sub-group data signals with enhanced image-resolution and/or refreshing-rate of a frame of sub-image to be displayed in the display panel.

14. The method of claim 11, further comprising enhancing image-resolution and/or refreshing-rate of a respective one of the at least two sub-groups of data signals; and
strengthening the respective one of the at least two sub-groups of data signals if signal attenuation thereof is greater than a threshold before converting signal format of a respective one of the at least two sub-groups of data signals to a displayable format corresponding to the display panel.

15. The method of claim 11, wherein the display panel comprises at least two display areas, wherein each of the at least two display areas is controlled by a respective one of multiple scan units connected to multiple gate lines and a respective one of multiple drive units connected to multiple data lines to independently configured to display a frame of sub-image; wherein each of the at least two display areas comprises multiple gate lines independently connected to a respective one of multiple scan units and multiple data lines independently connected to a respective one of multiple drive units;
wherein splitting the group of source data signals into at least two sub-groups of data signals comprises:
splitting the group of source data signals into the at least two sub-groups of data signals respectively corresponding to the at least two display areas; and
transmitting the at least two sub-groups of data signals respectively to the at least two display areas to display respective frames of sub-images thereof.

16. The method of claim 15, wherein controlling the display panel to display a frame of image based on the at least two sub-groups of data signals comprises:
controlling the respective one of the multiple scan units to sequentially turn on the multiple gate lines of associated with a respective one of the at least two display areas corresponding to a respective one of the at least two sub-groups of data signals; and
controlling the respective one of the multiple drive units to transfer the respective one of the at least two sub-groups of data signals respectively to the multiple data lines;

wherein the at least two display areas are configured to display the respective frames of sub-images simultaneously, thereby displaying the frame of image in the display panel.

17. A computer-program product comprising a non-transitory tangible computer-readable medium having computer-readable instructions thereon, the computer-readable instructions being executable by a processor to cause the processor to perform:
receiving a group of source data signals corresponding to a frame of image;
splitting the group of source data signals into at least two sub-groups of data signals;
converting signal format of a respective one of the at least two sub-groups of data signals to a displayable format corresponding to a display panel;
transmitting the respective one of the at least two sub-groups of data signals in the displayable format to the display panel; and
controlling the display panel to display a frame of image based on the at least two sub-groups of data signals;
wherein splitting the group of source data signals into at least two sub-groups of data signals comprises:
splitting the group of source data signals into a first sub-group of odd-row data signals and a second sub-group of even-row data signals;
performing an interpolation process to first sub-group of odd-row data signals and/or the second sub-group of even-row data signals to generate a sub-group of even-row interpolated-data signals associated with the first sub-group of odd-row data signals and/or a sub-group of odd-row interpolated-data signals associated with the second sub-group of even-row data signals; and
displaying a frame of image based on the first sub-group of odd-row data signals plus a sub-group of even-row interpolated-data signals obtained via the interpolation process to a display area in a first side of the display panel with a same image-resolution as the frame of image based on the group of source data signals and displaying a frame of image based on the second sub-group of even-row data signals after interpolation process to a display area in a second side of the display panel with a same image-resolution as the frame of image based on the group of source data signals.

* * * * *